United States Patent
Gaylo (10) Patent No.: US 9,573,832 B2
(45) Date of Patent: Feb. 21, 2017

(54) METHOD OF REFORMING GLASS

(71) Applicant: CORNING INCORPORATED, Corning, NY (US)

(72) Inventor: Keith Raymond Gaylo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 73 days.

(21) Appl. No.: 14/489,823

(22) Filed: Sep. 18, 2014

(65) Prior Publication Data
US 2015/0114042 A1      Apr. 30, 2015

Related U.S. Application Data

(60) Provisional application No. 61/895,075, filed on Oct. 24, 2013.

(51) Int. Cl.
| | |
|---|---|
| C03B 23/00 | (2006.01) |
| C03B 23/025 | (2006.01) |
| C03B 23/03 | (2006.01) |
| C03B 23/035 | (2006.01) |
| G05D 23/00 | (2006.01) |
| C03B 40/00 | (2006.01) |
| C03B 29/02 | (2006.01) |
| C03B 29/08 | (2006.01) |

(52) U.S. Cl.
CPC ......... *C03B 23/0086* (2013.01); *C03B 23/025* (2013.01); *C03B 23/0258* (2013.01); *C03B 23/03* (2013.01); *C03B 23/0357* (2013.01); *C03B 29/025* (2013.01); *C03B 29/08* (2013.01); *C03B 40/005* (2013.01); *G05D 23/00* (2013.01)

(58) Field of Classification Search
None
See application file for complete search history.

(56) References Cited

U.S. PATENT DOCUMENTS

| | | |
|---|---|---|
| 317,706 A | 5/1885 | Bedbury |
| 2,766,555 A | 10/1956 | Jendrisak et al. |

(Continued)

OTHER PUBLICATIONS

International Search Report and Written Opinion of the International Searching Authority; PCT/US2014/061662; Mailed Feb. 3, 2015.

*Primary Examiner* — Lisa Herring
(74) *Attorney, Agent, or Firm* — John T. Haran (57) ABSTRACT

A method of reforming glass includes placing a glass sheet on a mold having a shaping surface for forming the glass sheet into a shaped glass article. A target starting mold forming temperature and temperature window are selected for the mold. A target starting mold forming temperature and temperature window are also selected for the glass sheet. The glass sheet and mold are simultaneously exposed to a first furnace condition controlled to a furnace temperature set point above the target starting mold forming temperature until a temperature of the mold is within the first temperature window. The glass sheet and mold are simultaneously exposed to a second furnace condition controlled to a furnace temperature set point between the target starting mold forming temperature and first furnace temperature set point until a temperature of the glass sheet is within the second temperature window, after which forming of the glass sheet starts.

16 Claims, 4 Drawing Sheets

(56) References Cited

U.S. PATENT DOCUMENTS

| | | | |
|---|---|---|---|
| 2,970,405 A | 2/1961 | Giffen | |
| 3,607,186 A | 9/1971 | Bognar | 65/104 |
| 4,483,700 A | 11/1984 | Forker, Jr. et al. | |
| 5,674,790 A | 10/1997 | Araujo | |
| 7,666,511 B2 | 2/2010 | Ellison et al. | |
| 8,082,755 B2 | 12/2011 | Angel et al. | 65/60.1 |
| 8,604,333 B2 | 12/2013 | Angel et al. | |
| 8,701,443 B2 | 4/2014 | Bailey et al. | 65/288 |
| 8,783,066 B2 | 7/2014 | Bailey et al. | |
| 2009/0277224 A1 | 11/2009 | Angel et al. | 65/60.1 |
| 2010/0000259 A1 | 1/2010 | Ukrainczyk et al. | 64/104 |
| 2012/0047953 A1* | 3/2012 | Feng | C03B 11/086 65/102 |
| 2012/0297828 A1* | 11/2012 | Bailey | C03B 23/0235 65/29.18 |
| 2013/0125588 A1 | 5/2013 | Kladias et al. | |

\* cited by examiner

METHOD OF REFORMING GLASS

CROSS-REFERENCE TO RELATED APPLICATIONS

This application claims the benefit of priority under 35 U.S.C. §119 of U.S. Provisional Application Ser. No. 61/895,075 filed on Oct. 24, 2013 the content of which is relied upon and incorporated herein by reference in its entirety.

BACKGROUND

1. Field

The present disclosure relates generally to glass reforming. More particularly, the present disclosure relates to heating of a mold and glass sheet to target mold and glass forming temperatures, respectively, using a common heat source.

2. Description of the Related Art

Glass sheet reforming process involves placing a glass sheet on a mold, heating the glass sheet and mold to their respective forming temperatures, and forming the glass sheet into a shaped glass article. Forming of the glass sheet involves conforming the glass sheet to a shaping surface of the mold. The mold is typically made of metal and has to be operated at temperatures that would avoid failure of the mold material and/or rapid decline of the shaping surface quality. Often, this means that the glass has a maximum permissible temperature when in contact with the shaping surface. However, the glass temperature cannot be too low to the point that it is impossible to form the glass without damaging the glass. The result is that each of the mold and glass sheet will have relatively narrowly defined temperature targets that must be attained at the time that the forming of the glass sheet starts in order to have a successful forming of the glass.

Typically, both the glass sheet and mold begin at temperatures below their desired forming temperatures and are heated together in a common furnace or series of furnaces until their respective forming temperatures are achieved. In some furnace systems, the mold will reach its target forming temperature sooner than the glass sheet, requiring extra mold cooling to slow down the heating rate of the mold and allow more time for the glass sheet to heat up to its target forming temperature. In other furnace configurations, the glass sheet will heat up too quickly, requiring that the furnace temperature must be reduced to maintain the glass temperature effectively in an equilibrium state between the slowly heating mold and the furnace walls until both the mold and glass sheet reach their respective targets. Both of these methods yield a slower process than necessary and are difficult to control precisely.

SUMMARY

The subject matter disclosed herein generally relates to a method of reforming glass. In one aspect, the method includes means for attaining a range of desired glass and mold temperatures at the start of the forming process with a degree of independence not previously possible when using a common heat source for both the mold and glass. The method is particularly effective when used in a system that comprises a number of independently controlled furnaces through which the mold and glass assembly indexes or translates in order to attain forming temperature. This indexing arrangement permits the thermal conditions to be changed almost instantaneously, thus avoiding the slow response typically encountered when a furnace set point is changed.

The method takes advantage of two physical attributes of the glass sheet reforming process. First, the glass sheet has a much smaller mass and heat capacity compared to the mold. As a result, the glass sheet will respond rapidly to a sudden change in thermal condition, while the mold will respond comparatively slowly to the new thermal condition. Secondly, the desired glass temperature at the start of forming is generally higher than the desired mold temperature at the start of forming. This circumstance allows the selection of a set of temperature set points for the furnaces that maximizes the cooling effect on glass temperature while minimizing that same effect on the mold. For example, a furnace temperature set point higher than the mold temperature and lower than the glass temperature can simultaneously be a radiative heat source for the mold and a heat sink for the glass.

In one illustrative embodiment, a method of reforming glass comprises placing a glass sheet on a mold having a shaping surface for forming the glass sheet into a shaped glass article. A target starting mold forming temperature for the mold and a first temperature window comprising the target starting mold forming temperature are selected. Also, a target starting glass forming temperature for the glass sheet and a second temperature window comprising the target starting glass forming temperature are selected. These temperature targets and windows are selected based on formability of the glass sheet and preservation of mold and shaping surface integrity. The windows are typically relatively narrow, e.g., ±20° C. around each target, although relatively wider windows, e.g., up to ±35° C., are possible depending on the sensitivity of the glass and mold materials to the forming conditions.

The method further includes providing a first furnace condition controlled to a first furnace temperature set point above the target starting mold forming temperature. A second furnace condition controlled to a second furnace temperature set point above the target starting mold forming temperature but below the first furnace temperature set point is also provided. The glass sheet and mold are simultaneously exposed to the first furnace condition until a temperature of the mold is within the first temperature window comprising the target starting mold forming temperature. Following the exposure to the first furnace condition, the glass sheet and mold are simultaneously exposed to the second furnace condition until a temperature of the glass sheet is within the second temperature window comprising the target starting glass forming temperature. Forming of the glass sheet into a shaped glass article starts after the temperature of the glass sheet is within the second temperature window.

In an illustrative embodiment, a system for reforming glass includes a furnace; a mold having a shaping surface for forming a glass sheet into a shaped glass article; a heating source; and a controller configured to: (i) receive a target starting mold forming temperature for the mold and a first temperature window comprising the target starting mold forming temperature; (ii) receive a target starting glass forming temperature for the glass sheet and a second temperature window comprising the target starting glass forming temperature; (iii) adjust an output of the heating source to achieve a first furnace condition controlled to a first furnace temperature set point above the target starting mold forming temperature; (iv) maintain the first furnace condition until a temperature of the mold is within the first temperature window; (v) adjust an output of the heating source to achieve a second furnace condition controlled to a second furnace temperature set point above the target starting mold forming temperature but below the first furnace temperature set point; and (vi) maintain the second furnace condition until a temperature of the glass sheet is within the second temperature window.

In another illustrative embodiment, a system for reforming glass includes a first furnace comprising a first heating source; a second furnace comprising a second heating source; a mold having a shaping surface for forming a glass sheet into a shaped glass article indexable from the first furnace to the second furnace; and a controller configured to: (i) receive a target starting mold forming temperature for the mold and a first temperature window comprising the target starting mold forming temperature; (ii) receive a target starting glass forming temperature for the glass sheet and a second temperature window comprising the target starting glass forming temperature; (iii) adjust an output of the first heating source to achieve a first furnace condition controlled to a first furnace temperature set point above the target starting mold forming temperature; (iv) maintain the first furnace condition until a temperature of the mold is within the first temperature window; (v) adjust an output of the second heating source to achieve a second furnace condition controlled to a second furnace temperature set point above the target starting mold forming temperature but below the first furnace temperature set point and (vi) maintain the second furnace condition until a temperature of the glass sheet is within the second temperature window.

The summary above is intended to provide an introduction to the present disclosure. It is not intended to identify key or critical elements of the disclosure or to delineate the scope of the disclosure. Various aspects and embodiments of the disclosure will be described in greater detail below with reference to the accompanying drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

Figure 1:
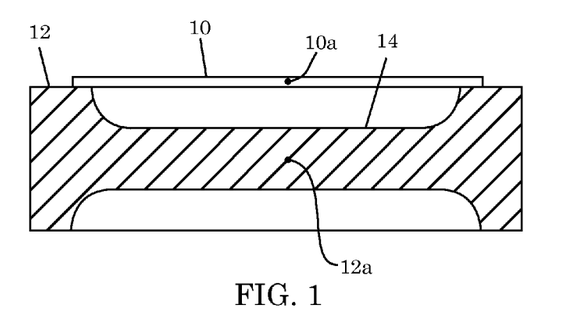
FIG. 1 shows a glass sheet on a mold.

FIG. 1 shows a glass sheet 10 placed on top of a mold 12 having a shaping surface 14 for forming the glass sheet 10 into a shaped glass article. The shape of the shaping surface 14 will be dictated by the desired shape of the shaped glass article. Alignment features (not shown), such as pins and the like, may be used to align the glass sheet 10 on the mold 12.

The glass sheet 10 has a glass composition selected based on the desired properties of the shaped glass article. For example, for applications requiring high strength and scratch resistance, the glass sheet 10 may be made of an ion-exchangeable glass, i.e., a glass containing relatively small alkali metal or alkaline-earth metal ions that can be exchanged for relatively large alkali metal or alkaline-earth metal ions. Examples of ion-exchangeable glasses can be found in the patent literature, e.g., U.S. Pat. No. 7,666,511 (Ellison et al; 20 Nov. 2008), U.S. Pat. No. 4,483,700 (Forker, Jr. et al.; 20 Nov. 1984), and U.S. Pat. No. 5,674,790 (Araujo; 7 Oct. 1997), and are also available from Corning Incorporated under the trade name GORILLA® glass. Typically, these ion-exchangeable glasses are aluminosilicate glasses. The ion-exchangeable glass will allow chemical strengthening of the shaped glass article by ion-exchange, which would also improve the scratch resistance of the glass article.

In some embodiments, the glass sheet comprises an aluminosilicate glass. In some embodiments, the aluminosilicate glass comprises at least about 50 mol % $SiO_2$ and at least about 11 mol % $Na_2O$, and the compressive stress is at least about 900 MPa. In some embodiments, the aluminosilicate glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In some embodiments, the aluminosilicate glass further comprises from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. In some embodiments, the aluminosilicate glass comprises from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol % $\leq Li_2O+Na_2O+K_2O \leq 20$ mol % and 0 mol % $\leq MgO+CaO \leq 10$ mol %.

The mold 12 is made of a material that can withstand high temperatures, e.g., temperatures in excess of 500° C., for several glass forming cycles. The mold material may be one that will not react with (or not stick to) the glass under forming conditions, or the shaping surface 14 may be coated with a coating material that will not react with (or not stick to) the glass under forming conditions. In one example, the mold 12 is made of a non-reactive carbon material, such as graphite, and the shaping surface 14 is highly polished to avoid introducing defects into the glass surface. In another example, the mold 12 is made of a dense ceramic material, such as silicon carbide, tungsten carbide, silicon nitride, or boron nitride, and the shaping surface 14 is coated with a non-reactive material, such as graphite. In another example, the mold 12 is made of a superalloy such as INCONEL 718, which is a nickel-chromium alloy, and the shaping surface 14 is coated with a hard ceramic material, such as titanium aluminum nitride. In yet another example, the mold 12 is made of pure nickel, such as commercially pure nickel grade 200 (99.6% Ni, 0.04% C), 201 (99.6% Ni, 0.02% C maximum), 205 (99.6% Ni, 0.04% C, 0.04% Mg), 212 (97.0% Ni), 222 (99.0% Ni), 233 (99% Ni), or 270 (99.97% Ni), and the shaping surface 14 is coated with nickel oxide. The coating on the shaping surface 14 may have a thickness in a range from 100 nm to 20 μm. The atmosphere around the mold 12 should be inert at forming conditions if the mold 12 is made of a carbon material or if the shaping surface 14 is coated with a carbon material.

In one illustrative embodiment, a method of reforming the glass sheet 10 involves selecting a target starting glass forming temperature $T_g$ and a target starting glass forming temperature window $T_g \pm \delta_g$. The target starting glass forming temperature will typically be narrow. For example, $\delta_g$ could be up to about 35° C., 40° C., 45° C., or 50° C. In some embodiments, $\delta_g$ is in a range from about 20° C. to about 35° C. In some other embodiments, $\delta_g$ is about 20° C. The target starting glass forming temperature $T_g$ is the desired glass temperature at the start of forming the glass sheet 10. This temperature can be measured at the center 10a of the glass sheet. Forming is the process by which the glass sheet 10 is shaped by the shaping surface 14. For forming to take place, the temperature of the glass sheet 10 must be in the viscoelastic range to enable the glass sheet 10 to be deformed without being damaged. The target starting glass forming temperature $T_g$ is selected based on viscoelastic properties of the glass sheet 10 and material properties of the mold 12 and shaping surface 14. In general, the target starting glass forming temperature $T_g$ is selected to preserve integrity of the shaping surface 14 through several forming cycles to avoid defects such as "orange peel" on the glass surface of the shaped glass article and to facilitate forming of the glass sheet 10. In some embodiments, the target starting glass forming temperature $T_g$ is selected to preserve integrity of the shaping surface 14 through at least 5,000 forming cycles. In some embodiments, the target starting glass forming temperature $T_g$ is selected to preserve integrity of the shaping surface 14 through at least 10,000 forming cycles.

In one illustrative embodiment, the target starting glass forming temperature $T_g$ is between a temperature corresponding to a glass viscosity of $10^{13}$ poise and a temperature corresponding to a glass viscosity of $10^7$ poise. In a one embodiment, the target starting glass forming temperature $T_g$ is between a temperature corresponding to a glass viscosity of $10^{11}$ poise and a temperature corresponding to glass viscosity of $10^7$ poise. In another embodiment, the target starting glass forming temperature $T_g$ is between a temperature corresponding to a glass viscosity of $10^{9.1}$ poise and a temperature corresponding to a glass viscosity of $10^7$ poise. In yet another embodiment, the target starting glass forming temperature $T_g$ is between a temperature corresponding to a glass viscosity of $10^{8.9}$ poise and a temperature corresponding to a glass viscosity of $10^8$ poise. In one embodiment, $T_g$ is greater than 300° C. In another embodiment, $T_g$ is greater than about 400° C. In yet another embodiment, $T_g$ is greater than 500° C. In other embodiments, $T_g$ is greater than about 600° C. For glasses useful in forming high-strength glass articles, such as covers and the like for portable electronic devices, $T_g$ may be in a range from about 700° C. to about 1,100° C. In other embodiments, $T_g$ may be in range from 700° C. to 950° C. In some other embodiments, $T_g$ may be in range from about 700° C. to about 800° C.

The method also involves selecting a target starting mold forming temperature $T_m$ and a target starting mold forming temperature window $T_m \pm \delta_m$. The target starting mold forming temperature window will typically be narrow. For example, $\delta_m$ could be up to about 35° C., 40° C., 45° C., or 50° C. In some embodiments, $\delta_m$ is in a range from about 20° C. to about 35° C. In some other embodiments, $\delta_m$ is about 20° C. The target starting mold forming temperature $T_m$ is the desired mold temperature at the start of forming the glass sheet 10 into a shaped glass article. This temperature can be measured at the center 12a of the mold. The target starting mold forming temperature $T_m$ is selected based on mold properties, shaping surface properties, and acceptable temperature difference between the glass sheet and mold surface when the glass sheet contacts the shaping surface. Typically, the target starting mold forming temperature $T_m$ will be below the target starting glass forming temperature $T_g$. In some embodiments, the target starting mold forming temperature $T_m$ will be below the target starting glass forming temperature $T_g$ by about 40° C., 50° C., 60° C., 70° C., 80° C., 90° C., 100° C. or more. In some embodiments, the target starting mold forming temperature $T_m$ will be below the target starting glass forming temperature $T_g$ by between about 40° C. and about 100° C., about 40° C. and about 200° C., about 40° C. and about 300° C., or about 40° C. and about 400° C. In some other embodiments, the target starting mold forming temperature $T_m$ will be below the target starting glass forming temperature $T_g$ by at least about 100° C. In some embodiments, the target starting mold forming temperature $T_m$ will be below the target starting glass forming temperature $T_g$ by between about 100° C. and about 400° C.

In some illustrative embodiments related to forming of high-strength glass articles, the target starting glass forming temperature $T_g$ is in a range from about 700° C. to about 1,100° C. and the target starting mold forming temperature $T_m$ is in a range from about 550° C. to about 750° C. In some examples, the target starting glass forming temperature $T_g$ is in a range from about 700° C. to about 950° C. and the target starting mold forming temperature $T_m$ is in a range from about 550° C. to about 750° C. In other examples, the target starting glass forming temperature $T_g$ is in a range from about 700° C. to about 800° C. and the target starting mold forming temperature $T_m$ is in a range from about 600° C. to about 660° C.

In one exemplary embodiment, the following temperature targets and windows are selected: target starting glass forming temperature $T_g=745°$ C., target starting glass forming temperature window $T_g \pm \delta_g=745°$ C.$\pm 10°$ C., target starting mold forming temperature $T_m=635°$ C., and target starting mold forming temperature window $T_m \pm \delta_m=635°$ C.$\pm 10°$ C. These targets could be used with a glass sheet 10 comprising Code 2317 GORILLA® glass (an example of an aluminosilicate glass), a mold 12 made of INCONEL 718 superalloy (an example of a nickel-chromium alloy), and a shaping surface 14 coated with titanium aluminum nitride (an example of a hard ceramic material).

In another exemplary embodiment, the following temperature targets and windows are selected: target starting glass forming temperature $T_g=795°$ C., target glass forming temperature window $T_g \pm \delta_g=795°$ C.$\pm 20°$ C., target starting mold forming temperature of 645° C., and target starting mold forming temperature of $T_m \pm \delta_m=645°$ C.$\pm 10°$ C. These targets could be used with a glass sheet 10 comprising Code 2317 GORILLA® glass, a mold 12 made of commercially pure nickel grade 201, and a shaping surface 14 coated with nickel oxide.

The exemplary temperature targets described above are not intended to be limiting because, as already explained above, the targets will be selected based on the properties of the glass sheet to be formed and the properties of the mold and shaping surface to be used in the forming of the glass sheet.

The method further involves heating the glass sheet 10 to a temperature within the selected target starting glass forming temperature window $T_g \pm \delta_g$ and the mold 12 to a temperature within the selected target starting mold forming temperature window $T_m \pm \delta_m$. The heating of the glass sheet and mold occurs simultaneously under a common heat source. The method involves balancing the heating of the glass sheet and mold such that the desired target forming temperatures are achieved at the start of the forming process. In one or more embodiments, the heating is achieved in two furnace phases: a high-temperature furnace phase during which the mold temperature is increased rapidly to a temperature within the target starting mold forming temperature window $T_m \pm \delta_m$ and a reduced-temperature furnace phase during which the glass temperature decreases rapidly to a temperature within the target starting glass forming temperature window $T_g \pm \delta_g$ while the mold temperature levels off to a temperature within or near the target starting mold forming temperature window $T_m \pm \delta_m$. Typically, the temperatures that will be of interest (or that will determine whether the targets are met) are the center temperature of the glass sheet (10a in FIG. 1) and the center temperature of the mold (12a in FIG. 1). Typically, the reduced-temperature furnace phase will occur immediately after the high-temperature furnace phase, and forming of the glass sheet 10 will start after the glass temperature is within the target starting glass forming temperature window $T_g \pm \delta_g$ and the mold temperature is within or near the target starting mold forming temperature window $T_m \pm \delta_m$.

The high-temperature furnace phase takes place in a high-temperature furnace condition, which is defined as a furnace condition that is controlled to a furnace temperature set point $T_1$ significantly above the target starting mold forming temperature $T_m$. In some examples, the furnace temperature set point $T_1$ is about 100° C., 125° C., 150° C., 175° C., 200° C., or more above the target starting mold forming temperature $T_m$. In other examples, the furnace temperature set point $T_1$ is 200° C. or more above the target starting mold forming temperature $T_m$. In some examples, the furnace temperature set point $T_1$ is about 50° C. to about 400° C., about 50° C. to about 300° C., about 100° C. to about 300° C., about 100° C. to about 200° C., about 150° C. to about 400° C., or about 150° C. to about 300° C. above the target starting mold forming temperature $T_m$. Typically, the furnace temperature set point $T_1$ will also be above the target starting glass forming temperature $T_g$.

Figure 2:
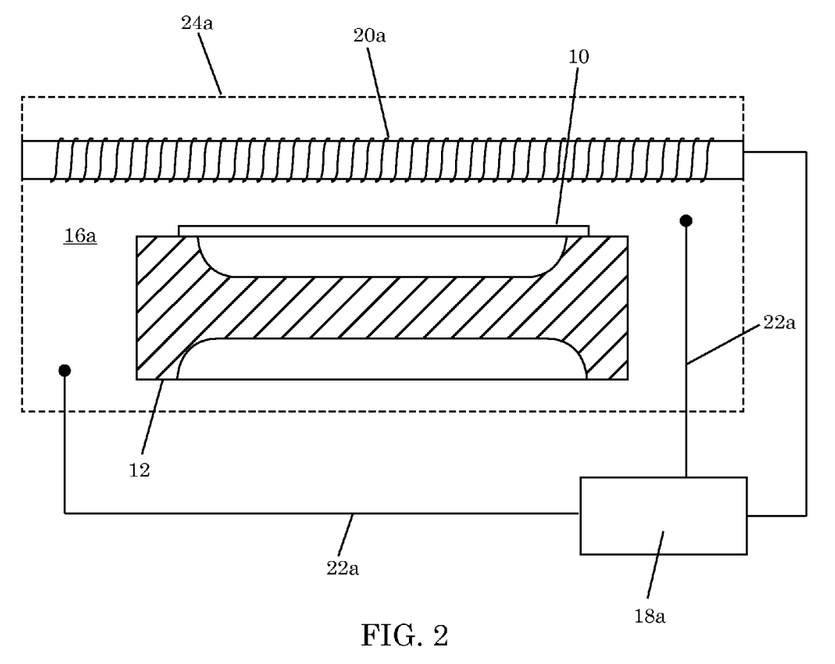
FIG. 2 shows a glass sheet and mold in a high temperature furnace condition.

FIG. 2 illustrates a high-temperature furnace condition 16a provided in a furnace zone (or station) 24a by a heat source 20a and a controller 18a. The heat source 20a provides the heat and may incorporate any suitable heating elements, such as mid-infrared heaters, induction heaters, or resistive heaters. The controller 18a adjusts the output of the heat source 20a to achieve the desired furnace temperature set point $T_1$ and high-temperature furnace condition 16a. The controller 18a may receive the desired furnace temperature set point $T_1$ as input. The controller 18a may receive temperature measurements from the furnace zone 24a, as shown at 22a, and use these measurements to determine how to adjust the output of the heat source 20a to maintain the high-temperature furnace condition 16a. The controller 18a may include a processor to compute differences between the desired furnace temperature set point $T_1$ and actual temperature measurements to determine how to adjust the output of the heat source 20a.

The method involves simultaneously exposing the glass sheet 10 and mold 12 to the high-temperature furnace condition 16a, wherein the mold 12 is rapidly heated to a temperature within the target starting mold forming temperature window $T_m \pm \delta_m$. While the mold 12 is being rapidly heated, the glass sheet 10 will also be rapidly heated. However, because the glass sheet 10 has a much smaller mass than the mold 12, it will be heated at a faster rate than the mold is heated. The glass sheet 10 will heat up until it reaches an equilibrium between the common furnace heat source 20a and the mold 12. The glass temperature will continue to rise as the mold 12 heats up. The glass temperature is allowed to, and typically will, significantly exceed the target starting glass forming temperature window $T_g \pm \delta_g$.

It should be noted that the glass sheet 10 and mold 12 may be preheated to varying degrees prior to exposing the glass sheet and mold to the high-temperature furnace condition 16a. Therefore, the glass sheet and mold may not be at the same temperature or at room temperature at the start of the high-temperature furnace phase.

Figure 3:
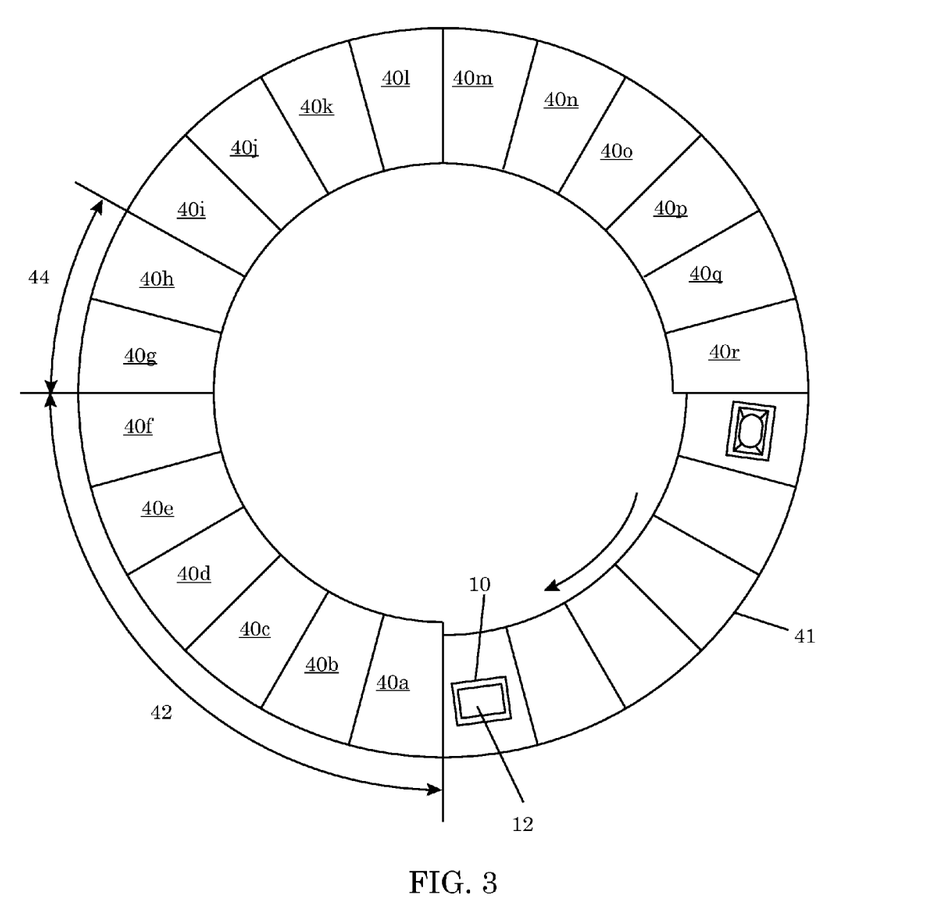
FIG. 3 shows a glass manufacturing system.

The high-temperature furnace condition 16a may be provided in a single furnace zone as shown in FIG. 2 or in a series of furnace zones. FIG. 3 shows a portion of a glass manufacturing system including a sequence of furnace zones (or stations) 40a through 40r arranged along a rotary table 41. The number of furnace zones in the glass manufacturing system may be more or less than what is shown in FIG. 3. The glass sheet 10 and mold 12 are loaded on the rotary table 41 and can be positioned within any of the furnace zones 40a through 40f via indexing or translation of the rotary table 41. For illustration purposes, the sequence of furnace zones 40a through 40f defines a high-temperature furnace zone 42 in which the high-temperature furnace phase takes place. In this case, the high-temperature furnace condition described above will be provided in each of the furnace zones 40a through 40f. However, it is not necessary that the furnace zones 40a through 4f are controlled to the same furnace temperature set point $T_1$. For example, the furnace temperature set points for the furnace zones 40a through 40f may have the order $T_{1,40a} < T_{1,40b} < T_{1,40c} < T_{1,40d} < T_{1,40e} < T_{1,40f}$, where $T_{1,40a}$ corresponds to the furnace temperature set point at the first furnace zone 40a, $T_{2,40b}$ corresponds to the furnace temperature set point at the second furnace zone 40b, and so forth. Even though the furnace temperature set points for the furnace zones 40a through 40f may be different, the furnace temperature set points will still have the characteristics explained above for the furnace temperature set point $T_1$. The furnace temperature set points may be selected such that $T_{1,40f}$ for the sixth or last furnace zone 40f is the same as the furnace temperature set point $T_1$ for a single furnace zone setup. It should be clear that the high-temperature furnace zone 42 may have more or less than six furnace zones. Use of multiple furnace zones for the high-temperature furnace phase may provide advantages over a single furnace zone setup in a continuous glass manufacturing process in that more than one pair of glass sheet and mold can be processed at the same time or in sequence.

The reduced-temperature furnace phase takes place under a reduced-temperature furnace condition, which is defined as a furnace condition that is controlled to a furnace temperature set point $T_2$ above the target starting mold forming temperature $T_m$ (and usually above the target starting mold forming temperature window $T_m \pm \delta_m$) and below the furnace temperature set point $T_1$ of the high-temperature furnace condition, i.e., $T_m < T_2 < T_1$. Where a series of furnace zones are used during the high-temperature furnace phase as explained above, the furnace temperature set point of the last furnace zone in the series may be used as the furnace temperature set point $T_1$ of the high-temperature furnace condition.

Figure 4:
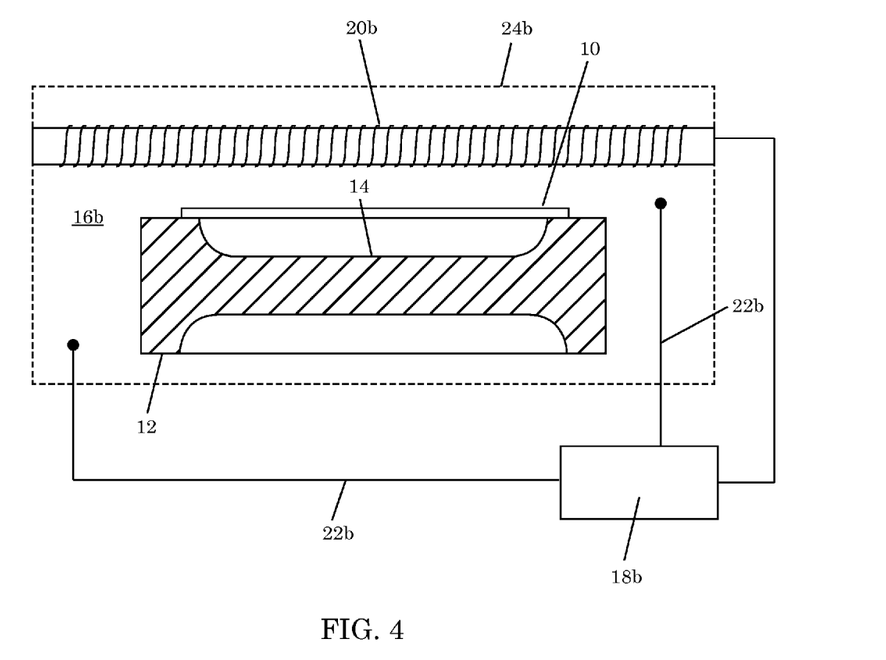
FIG. 4 shows a glass sheet and mold in a reduced temperature furnace condition.

FIG. 4 illustrates a reduced-temperature furnace condition 16b provided in a furnace zone (or station) 24b by a heat source 20b and a controller 18b. The heat source 20b provides the heat and may incorporate any suitable heating elements, such as mid-infrared heaters, induction heaters, or resistive heaters. The controller 18b adjusts the output of the heat source 20b to achieve the desired furnace temperature set point $T_2$ and reduced-temperature furnace condition 16b. The controller 18b may receive the desired furnace temperature set point $T_2$ as input. The controller 18b may receive temperature measurements from the furnace zone 24b, as shown at 22b, and use these measurements to determine how to adjust the output of the heat source 20b to maintain the reduced-temperature furnace condition 16b. The controller 18b may include a processor to determine the differences between the desired furnace temperature set point $T_2$ and the actual temperatures in the furnace zone 24b to determine how to adjust the output of the heat source 20b.

The method involves simultaneously exposing the glass sheet 10 and mold 12 to the reduced-temperature furnace condition 16b, typically for a shorter time period compared to the exposure period under the high-temperature furnace condition. Typically, exposure to the reduced-temperature furnace condition will occur immediately after the exposure to the high-temperature furnace condition. Under the reduced-temperature furnace condition, the glass sheet 10 with its small mass and low heat capacity will respond rapidly to the sudden change in furnace condition, while the mold 12 with its much larger mass and higher heat capacity will respond comparatively slowly to the new furnace condition. The glass sheet 10 and mold 12 are processed under the reduced-temperature furnace condition until the glass sheet is within the target starting glass forming temperature window $T_g \pm \delta_g$. Typically, at this time, the mold will also be within or near the target starting mold forming temperature window $T_m \pm \delta_m$. Forming starts after the glass sheet 10 reaches a temperature within the target starting glass forming temperature window $T_g \pm \delta_g$.

The reduced-temperature furnace phase is an important attribute of the method of reforming glass according to one aspect of the disclosure. The furnace temperature at this phase must be maintained above the mold temperature to the extent that the heat gained from the furnace by the mold is substantially sufficient to overcome the heat lost from the mold to other elements, e.g., cold furnace walls, active cooling devices, and conduction to cooler supporting structure. The reduced temperature must also be sufficiently low so that the glass sheet will cool to the desired temperature in the desired time. Typically, the reduced furnace temperature set point $T_2$ will be 10° C. to 50° C. lower than the target starting glass forming temperature and 80° C. to 100° C. higher than the target starting mold forming temperature. Once forming begins, the glass sheet will rapidly lose heat to the colder shaping surface as it comes into strong thermal contact with the shaping surface. Furnace temperature can be increased substantially at this point in order to maintain the glass temperature in the viscoelastic range to promote complete conformance of the glass to the mold.

The reduced-temperature furnace condition may be provided in a single furnace zone as shown in FIG. 4 or in a series of furnace zones. Returning to FIG. 3, the furnace zones 40g and 40h adjacent to the sequence of furnace zones 40a through 4f could be used for the reduced-temperature furnace phase. The furnace zones 40g and 40h could define a reduced-temperature furnace zone 44 in which the reduced-temperature phase takes place. In this case, the reduced-temperature condition will be provided in each of the furnace zones 40g and 40h. However, it is not necessary that the furnace zones 40g and 40h are controlled to the same furnace temperature set point. In one embodiment, the furnace temperature set points for the two furnace zones 40g and 40h have the order $T_{2,40g} > T_{2,40h}$, where $T_{2,40g}$ is the furnace temperature set point at the first furnace zone 40g (or the furnace zone immediately following the high-temperature furnace zone 42) and $T_{2,40h}$ is the furnace temperature set point at the second furnace zone 40h (or the last furnace zone in the reduced-temperature furnace zone 44), with each of $T_{2,40g}$ and $T_{2,40h}$ having the characteristics explained above for the furnace temperature set point $T_2$ of the reduced-temperature furnace condition. From above, $T_m < T_2 < T_1$, where $T_m$ is the target starting mold forming temperature and $T_1$ is the furnace temperature set point for the high-temperature furnace condition. Therefore, $T_m < T_{2,40h} < T_{2,40g} < T_1$. In this case, the glass sheet and mold will be exposed to the higher furnace temperature set point $T_{2,40g}$ at the first station and then to the lower furnace temperature set point $T_{2,40h}$ at the second station. The step down from $T_1$ to $T_{2,40g}$ will generally be much smaller than the step down from $T_{2,40g}$ to $T_{2,40h}$, which should have the effect of minimizing thermal shock in the glass sheet. In one embodiment, $T_{2,40g}$ is set above the target starting glass forming temperature $T_g$, or $T_g < T_{2,40g} < T_1$. The two-step reduced-temperature furnace phase can facilitate achieving the desired glass temperature in a controlled manner during the allotted time before the start of forming the glass sheet into a shaped glass article.

Forming of the glass sheet 10 into a shaped glass article starts after the glass sheet reaches a temperature within the target starting glass forming temperature window $T_g \pm \delta_g$. Typically, at the start of forming, the mold will be at a temperature within or near the target starting mold forming temperature window $T_m \pm \delta_m$. Forming involves conforming the glass sheet 10 to the shaping surface 14. The conforming may be accompanied by application of force to the glass sheet 10. Typically, the forming force will be in the form of vacuum applied between the glass sheet 10 and the shaping surface 14, where the applied vacuum will pull the glass sheet against the shaping surface. Alternative methods for applying force to the glass sheet is through a plunger mold and the like. The glass sheet 10 may be allowed to sag towards the shaping surface 14 by gravity before the forming force is applied. After the glass sheet 10 has been conformed to the shaping surface 14, the resulting shaped glass article may be held against the shaping surface for a few seconds to minimize or prevent warping of the shaped glass article. Vacuum may also be used as the source of the holding force. After the holding period, the shaped glass article can then be cooled down in a controlled manner, after which the shaped glass article can be separated from the mold. Typically, various operations are carried out during the forming to ensure that the mold and glass are at the proper temperatures to form the shaped glass article with the desired shape control. Such operations may include locally heating the glass, removing excess heat from the mold, and applying holding force to the shaped glass article in multiple stages, e.g., with a higher holding force followed by a smaller holding force. The forming process (and cooling process) can take place in the remaining furnace zones 40i through 40r of FIG. 3.

Figure 5:
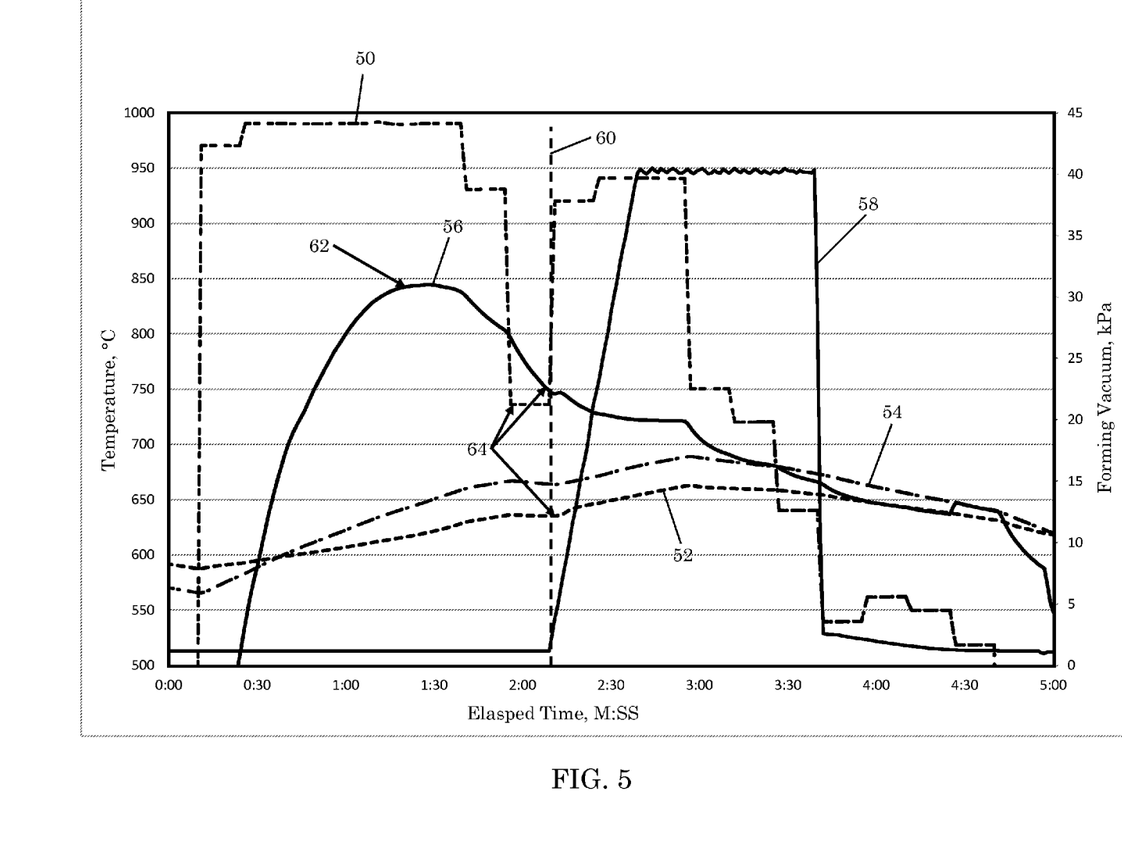
FIG. 5 shows an illustrative glass and mold cycle of a glass sheet reforming process.

FIG. 5 shows a typical mold and glass cycle illustrating the principles described above. Line 50 represents the furnace temperature. Line 52 represents the mold center temperature. Line 54 represents the mold edge temperature. Line 56 represents the glass center temperature. Line 58 represents the forming vacuum. For the example shown in FIG. 5, the heating of the glass sheet and mold and forming of the glass sheet were carried out in a series of furnace zones as shown in FIG. 3. The first six furnace zones were used for high-temperature processing of the mold and glass sheet, and the next two furnace zones were used for reduced-temperature processing of the mold and glass. The dashed line 60 indicates when forming of the glass starts.

In the example of FIG. 5, the target starting mold forming temperature window was 625° C. to 645° C. The limit of the window was set at 645° C. because a higher mold temperature would have damaged the particular protective coating used on the shaping surface (in this case, the protective coating was titanium aluminum nitride). In order to preserve the mold coating integrity and glass surface cosmetics, the glass temperature was also kept below 760° C. In particular, the target starting glass forming temperature window was 735° C. to 755° C.

The process was set up so that the furnace temperature set points for the first six furnace zones (for the high-temperature furnace phase) were all above 970° C., which is much greater than the target starting mold forming temperature window of 625° C. to 645° C. As can be clearly seen in FIG. 5, the peak glass temperature approached 850° C. (indicated by arrow 62) under these heating conditions, well beyond the target starting glass forming temperature window of 735° C. to 755° C.

The next two furnace zones (for the reduced-temperature furnace phase) then stepped down in furnace temperature set points, first to 930° C. (first furnace zone) and then all the way to 735° C. (second furnace zone). Under these reduced furnace temperatures (indicated by arrows 64), glass temperature dropped rapidly while mold temperatures merely leveled out. By this method, the mold center temperature at the start of forming the glass sheet, as shown at 60, was controlled to 635° C. with a corresponding glass temperature of 745° C. It should be noted that without the reduced-temperature furnace phase, the glass temperature would have been too high at the start of forming, leading to significantly shortened shaping surface coating operating life.

While embodiments have been described with respect to a limited number of examples, those skilled in the art, having benefit of this disclosure, will appreciate that other embodiments can be devised which do not depart from the scope as disclosed herein.

The invention claimed is:

1. A method of reforming glass, comprising:
(a) placing a glass sheet on a mold having a shaping surface for forming the glass sheet into a shaped glass article;
(b) selecting a target starting mold forming temperature for the mold and a first temperature window comprising the target starting mold forming temperature;
(c) selecting a target starting glass forming temperature for the glass sheet and a second temperature window comprising the target starting glass forming temperature;
(d) providing a first furnace condition controlled to a first furnace temperature set point above the target starting mold forming temperature;
(e) simultaneously exposing the glass sheet and mold to the first furnace condition until a temperature of the mold is within the first temperature window;
(f) providing a second furnace condition controlled to a second furnace temperature set point above the target starting mold forming temperature but below the first furnace temperature set point;
(g) simultaneously exposing the glass sheet and mold to the second furnace condition until a temperature of the glass sheet is within the second temperature window;
(h) starting forming of the glass sheet into the shaped glass article after the temperature of the glass sheet is within the second temperature window;
(i) providing a third furnace condition controlled to a third furnace temperature set point above the second furnace temperature set point but below the first furnace temperature set point; and
(j) prior to the simultaneously exposing of (g), simultaneously exposing the glass sheet and mold to the third furnace condition for a time period during which the temperature of the glass sheet drops from a first level at the end of the simultaneously exposing of step (e) to a second level between the first level and the target starting glass forming temperature.

2. The method of claim 1, wherein the providing of (i) comprises selecting the third furnace temperature set point to be above the target starting glass forming temperature.

3. The method of claim 1, wherein the simultaneously exposing of (e) comprises passing the glass sheet and mold through a plurality of furnace zones, wherein each of the furnace zones is controlled to a furnace temperature set point above the target starting mold forming temperature.

4. The method of claim 1, wherein the temperature of the glass sheet exceeds the second temperature window during the simultaneously exposing of (e).

5. The method of claim 1, wherein the temperature of the mold remains within the first temperature window during the simultaneously exposing of (g).

6. The method of claim 1, wherein the second furnace temperature set point is in a range from about 10° C. to about 50° C. below the target starting glass forming temperature range.

7. The method of claim 6, wherein the second furnace temperature set point is in a range from about 80° C. to about 100° C. above the target starting mold forming temperature.

8. The method of claim 1, wherein the first temperature window is within ±35° C. of the target starting mold forming temperature.

9. The method of claim 8, wherein the second temperature window is within ±35° C. of the target starting glass forming temperature.

10. The method of claim 1, wherein the first temperature window is within ±20° C. of the target starting mold forming temperature and the second temperature window is within ±20° C. of the target starting glass forming temperature.

11. The method of claim 1, wherein the target starting glass forming temperature is in a range from about 700° C. to about 950° C., and wherein the target starting mold forming temperature is in a range from about 550° C. to about 750° C.

12. The method of claim 1, wherein the target starting glass forming temperature is in a range from about 700° C. to about 800° C. and the target starting mold forming temperature is in a range from about 600° C. to about 660° C.

13. The method of claim 1, wherein the target starting mold forming temperature is at least 40° C. below the target starting glass forming temperature.

14. The method of claim 1, wherein the glass sheet has a viscosity in a range from about $10^7$ Poise to about $10^{11}$ Poise in the second temperature window.

15. The method of claim 1, wherein the glass sheet comprises an aluminosilicate glass and the shaping surface is coated with a metal oxide.

16. The method of claim 1, wherein the glass sheet comprises an aluminosilicate glass and the shaping surface is coated with a hard ceramic material.

* * * * *